Jan. 29, 1929.

D. T. BROWNLEE 1,700,694

STARTER

Filed April 25, 1927

Inventor

DALMAR T. BROWNLEE,

By *Schley & Trask*

Attorneys

Patented Jan. 29, 1929.

1,700,694

UNITED STATES PATENT OFFICE.

DALMAR T. BROWNLEE, OF INDIANAPOLIS, INDIANA, ASSIGNOR TO L. G. S. DEVICES CORPORATION, OF INDIANAPOLIS, INDIANA, A CORPORATION OF INDIANA.

STARTER.

Application filed April 25, 1927. Serial No. 186,251.

It is the object of my invention to produce a starter drive, particularly adaptable for use in connection with automobile engines. More specifically, it is my object to produce such a drive in which two gears are moved axially into mesh to connect the starter motor to the engine.

I accomplish the above object by mounting a starter motor so that its armature shaft is parallel to the axis of rotation of a gear which rotates with the engine crank shaft, and on the armature of the starter motor I mount a pinion which may be connected to the shaft through an overrunning clutch and which is axially slidable on the shaft into and out of engagement with the gear which rotates with the engine. I provide an operating means for jointly closing the starter-motor circuit and for moving the pinion into engagement with its associated gear.

Figure 1:
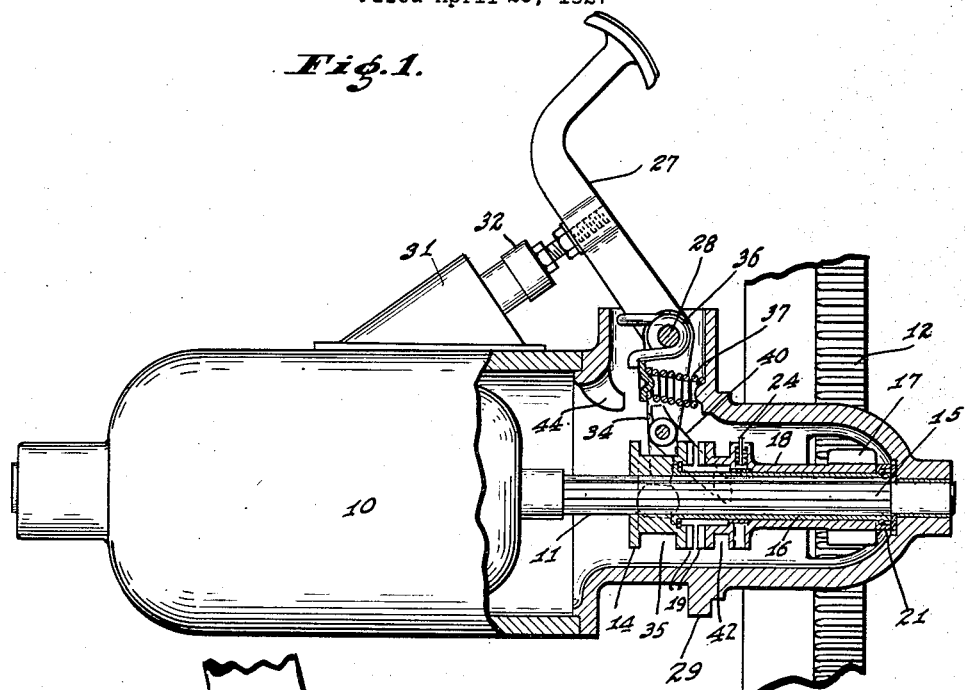
Figure 2:
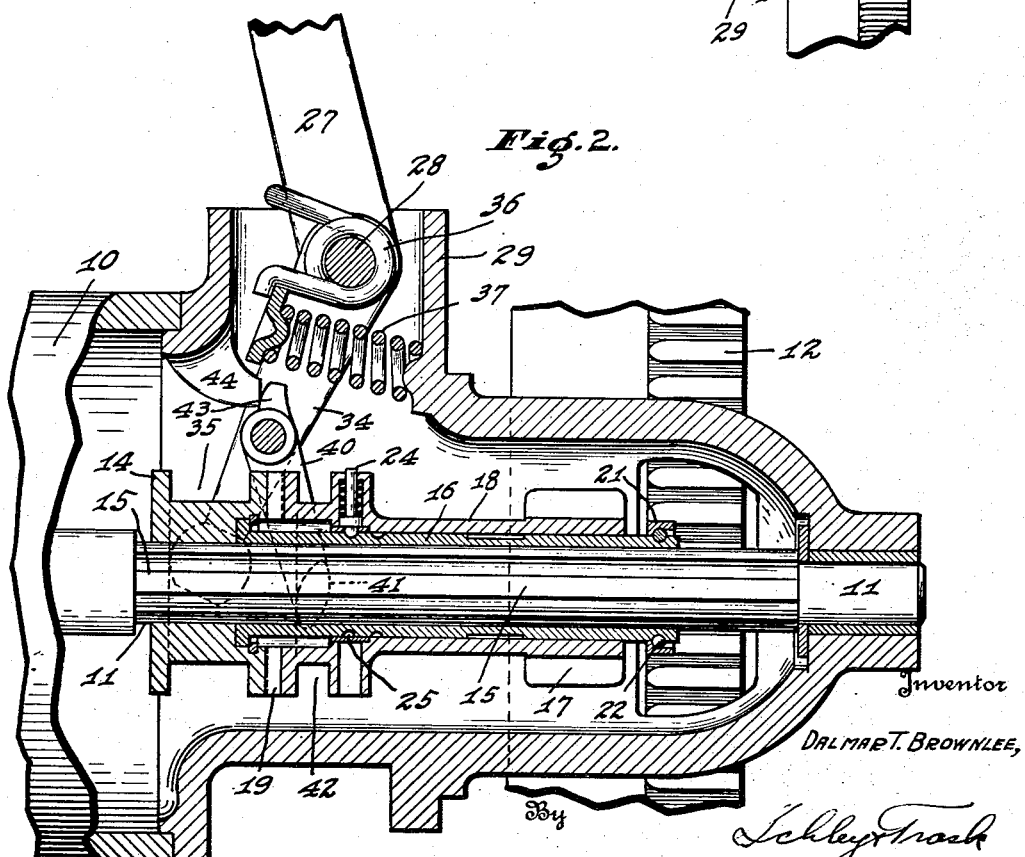

The accompanying drawing illustrates my invention; Fig. 1 is a longitudinal section through my starter drive with the parts in the position they occupy after the engine has begun to run under its own power; and Fig. 2 is a view similar to Fig. 1 but with the parts in the position occupied when the starter-motor is not in operation.

In carrying out my invention I mount a suitable electric starter motor 10 in such a position that its armature shaft 11 is parallel with the axis of rotation of a gear 12 which is rotatable with the engine. On the armature 11 is mounted a collar 14, such collar being axially slidable on the shaft but rotatable therewith. Preferably, the armature shaft is provided with splines 15 and the collar 14 with a splined hole.

Axially movable with the collar 14 is a sleeve 16 which rotatably supports a pinion 17 adapted to engage the gear 12. The pinion 17 has an extended hub 18 which terminates close to the collar 14, the adjacent faces of the hub and collar being provided with ratchet teeth 19. The pinion 17 and hub 18 are axially slidable on the sleeve 16 so that the hub may be moved into and out of engagement with the collar 14. This axial movement is limited in one direction by engagement of the hub 18 with the collar 14, and it may be limited in the other direction by means of an abutment in the form of a small collar 21 held in place on the sleeve 16 by means of a split spring ring 22 which lies in an annular groove in the sleeve. To prevent accidental displacement of the hub 17 from position at either end of its limited movement, the hub 18 may be provided with an inwardly spring-pressed pin 24 which co-operates with either one of a pair of annular grooves 25 on the outer surface of the sleeve 16. This pin 24 insures that the ratchet teeth of the hub 18 and collar 14 will be in engagement until the engine has begun to run under its own power; and after the engine has become self-operative and the clutch teeth disengaged, the pin 24 definitely prevents their re-engagement until after the pinion 17 has been moved out of engagement with the gear 12, thus preventing the injury to the clutch teeth which would result if they should come together while the pinion 17 is being driven at a high rate of speed by the engine.

Axial shifting of the pinion 17 into engagement with the gear 12 is preferably accomplished by the same means which operates to close the circuit of the starter-motor 10. This operating means may conveniently be a lever in the form of a foot pedal 27 which is pivotally mounted on a shaft 28 carried by a housing 29 which surrounds the starter drive. The circuit of the starter motor 10 is controlled by a switch 31 having a switch button 32 located in the plane of movement of the pedal 27 and adapted to be depressed to close the starter-motor circuit when the pedal 27 is depressed.

Mounted on the shaft 28 is a yoke 34 which cooperates with an annular groove 35 in the collar 14 so that the collar will be moved axially of the shaft 11 when the yoke 34 is moved about its axis of pivotal mounting. The pedal 27 and yoke 34 are preferably interconnected through some yielding means such as a torsion spring 36, so that movement of the pedal 27 to depress the switch button 32 will not be prevented if the teeth 17 and gear 12 should meet in end-to-end engagement which would interfere with axial movement of the collar 14.

A spring 37 acts between the yoke 34 and some stationary point and tends to swing the yoke about its axis of pivotal mounting in a direction to move the pinion 17 out of engagement with the gear 12. The yoke 34 has mounted on it an arm 40 the end of which is provided with a boss 41 adapted to be received within a groove 42 in the hub 18 of the pinion 17. The arm 40 has an extension 43 which is adapted to engage a stationary abutment 44 when the yoke 34 approaches the limit of its movement under the influence of the spring 37.

When the starter motor 10 is not being operated, the parts of the drive assume the positions shown in Fig. 2. Under these circumstances, the ratchet teeth 19 of the collar 14 and gear hub 18 are engaged and the pinion 17 is out of engagement with the gear 12. If now the pedal 27 is depressed the yoke 34 moves in a counter-clockwise direction about the shaft 28 and forces the pinion 17 into engagement with the gear 12. Simultaneously, the switch button 32 is depressed, thus causing rotation of the armature shaft 11 of the starter motor. This rotation of the shaft 11 is transmitted through the collar 14 and ratchet teeth 19 to the pinion 17 which rotates the gear 12 and cranks the engine. When the engine begins to operate under its own power, the gear 12 rotates more rapidly that it did during the cranking operation with the result that the pinion 17 and its hub 18 are rotated more rapidly than is the collar 14. Relative rotation of the collar 14 and gear hub 18 thus produce results in axial movement of the pinion and hub 18 on the sleeve 16 under the influence of the ratchet teeth 19, and causes the ratchet teeth of the hub to be disengaged from those of the collar 14. This breaks the driving connection between the armature shaft 11 and the gear 12 and permits each to rotate freely under the influence of the power-sources to which they are respectively connected.

Upon the release of the pedal 27, the spring 37 operates to move the pinion 17 axially out of engagement with the gear 12, as the yoke 34 approaches the limit of its movement under the influence of the spring 37, the extension 43 on the lever 40 engages the stationary abutment 44 and moves the pinion hub 18 axially on the sleeve 16 to re-engage the ratchet teeth 19 which were disengaged when the engine began to run under its own power.

Should the teeth of the pinion 17 meet those of the gear 12 in end-to-end engagement as the pinion is moved toward the gear, the yielding connection between the pedal 27 and yoke 34 permits further depression of the pedal to close the starter motor switch 31. The resultant rotation of the pinion 17 carries its teeth out of their end-to-end engagement with those of the gear 12 and permits the pinion to move into intermeshing engagement with the gear under the force exerted on the yoke 34 by the spring 36.

I claim as my invention:—

1. An engine starting device, comprising a gear connected to an engine, a starter motor, a starter-motor-driven shaft, a clutch member rotatable with said shaft, a second clutch member, said two clutch members having co-operating ratchet clutch teeth, said two clutch members being arranged to have a limited relative axial movement whereby they may be engaged and disengaged, a pinion rotatable with said second clutch member, said first clutch member being slidable on said shaft to move said pinion into and out of mesh with said gear, means tending to hold said two clutch members either in or out of engagement, a switch for said starter motor, control means for jointly closing said switch and moving said pinion into mesh with said gear, a spring for moving said pinion out of mesh with said gear upon release of said control means, and means for engaging said two clutch members when said pinion is moved out of mesh with said gear by said spring.

2. An engine starting device, comprising a gear connected to an engine, a starter motor, a starter-motor-driven shaft, a clutch member rotatable with said shaft, a second clutch member, said two clutch members having co-operating ratchet clutch teeth, said two clutch members being arranged to have a limited relative axial movement whereby they may be engaged and disengaged, a pinion rotatable with said second clutch member, said first clutch member being slidable on said shaft to move said pinion into and out of mesh with said gear, a switch for said starter motor, control means for jointly closing said switch and moving said pinion into mesh with said gear, a spring for moving said pinion out of mesh with said gear upon release of said control means, and means for engaging said two clutch members when said pinion is moved out of mesh with said gear by said spring, said last named means being inoperative to cause engagement of said two clutch members when said pinion is in mesh with said gear.

3. An engine starting device, comprising a gear connected to an engine, a starter motor, a starter-motor-driven shaft, a clutch member rotatable with said shaft, a second clutch member, said two clutch members having co-operating ratchet clutch teeth, said two clutch members being arranged to have a limited relative axial movement whereby they may be engaged and disengaged, a pinion rotatable with said second clutch member, said first clutch member being slidable on said shaft to move said pinion into and out of mesh with said gear, means tending to hold said two clutch members either in or out of engagement, a switch for said starter motor, control means for jointly closing said switch and moving said pinion into mesh with said gear, and means for engaging said two clutch members when said pinion is moved out of mesh with said gear.

4. An engine starting device, comprising a gear connected to an engine, a starter motor, a starter-motor-driven shaft, a clutch member rotatable with said shaft, a second clutch member, said two clutch members having co-operating ratchet clutch teeth, said two clutch members being arranged to have a limited relative axial movement whereby they may be engaged and disengaged, a pinion rotatable with said second clutch member, said first clutch member being slidable on said shaft to move said pinion into and out of mesh with said gear, a switch for said starter motor, control means for jointly closing said switch and moving said pinion into mesh with said gear, and means for engaging said two clutch members when said pinion is moved out of mesh with said gear, said last named means being inoperative to cause engagement of said two clutch members when said pinion is in mesh with said gear.

5. An engine starting device, comprising a gear connected to an engine, a starter motor, a starter-motor-driven shaft, a clutch member rotatable with said shaft, a second clutch member, said two clutch members having co-operating ratchet clutch teeth, said two clutch members being arranged to have a limited relative axial movement whereby they may be engaged and disengaged, a pinion rotatable with said second clutch member, said first clutch member being slidable on said shaft to move said pinion into and out of mesh with said gear, means for moving said pinion into and out of mesh with said gear, and means for engaging said two clutch members after said pinion is moved out of mesh with said gear said last named means being inoperative to cause engagement of said two clutch members when said pinion is in mesh with said gear.

6. An engine starting device, comprising a gear connected to an engine, a starter motor, a starter-motor-driven shaft, a clutch member rotatable with said shaft, a second clutch member, said two clutch members being arranged to have a limited relative axial movement whereby they may be engaged and disengaged, a pinion rotatable with said second clutch member, said first clutch member being slidable on said shaft to move said pinion into and out of mesh with said gear, means for moving said pinion into and out of mesh with said gear, and means for engaging said two clutch members after said pinion is moved out of mesh with said gear, said last named means being inoperative to cause engagement of said two clutch members when said pinion is in mesh with said gear.

7. An engine starting device, comprising a gear connected to an engine, a starter motor, a starter-motor-driven shaft, a clutch member rotatable with said shaft, a second clutch member, said two clutch members being arranged to have a limited relative axial movement whereby they may be engaged and disengaged, a pinion rotatable with said second clutch member, said first clutch member being slidable on said shaft to move said pinion into and out of mesh with said gear, a switch for said starter motor, control means for jointly closing said switch and moving said pinion into mesh with said gear, and means for engaging said two clutch members when said pinion is moved out of mesh with said gear, said last named means being inoperative to cause engagement of said two clutch members when said pinion is in mesh with said gear.

8. An engine starting device as set forth in claim 5 with the addition of a spring tending to move said pinion out of mesh with said gear.

9. An engine starting device as set forth in claim 6 with the addition of a spring tending to move said pinion out of mesh with said gear.

10. In combination, a rotatable shaft, a clutch member rotatable with said shaft, a second clutch member, said two clutch members being arranged to have a limited relative axial movement whereby they may be engaged and disengaged, a pinion rotatable with said second clutch member, said clutch members and said pinion being axially slidable on said shaft, means for moving said clutch members and pinion axially of said shaft from and to a predetermined normal position, and means for engaging said two clutch members when they are moved to such normal position, said last named means being inoperative to cause engagement of said two clutch members when they and said pinion are out of such normal position.

11. In combination, a rotatable driving clutch member, a second clutch member, said two clutch members being arranged to have a limited relative axial movement whereby they may be engaged and disengaged, a driven member rotatable with said second clutch members, said clutch members and said driven member being axially slidable on said shaft, means for moving said clutch members and driven members axially of said shaft from and to a predetermined normal position, and means for engaging said two clutch members when they are moved to such normal position, said last named means being inoperative to cause engagement of said two clutch members when they and said pinion are out of such normal position.

12. In combination, a rotatable shaft, a clutch member rotatable with said shaft, a second clutch member, said two clutch members having co-operating ratchet teeth, said two clutch members being arranged to have a limited relative axial movement whereby they may be engaged and disengaged, a pinion rotatable with said second clutch member, said clutch members and said pinion being axially slidable on said shaft, means for moving said clutch members and pinion axially of said shaft from and to a predetermined normal position, and means for engaging said two clutch members when they are moved to such normal position, said last named means being inoperative to cause engagement of said two clutch members when they and said pinion are out of such normal position.

13. An engine starting device, comprising a gear connected to an engine, a starter motor, a starter-motor-driven shaft, a clutch member rotatable with said shaft, a second clutch member, said two clutch members being arranged to have a limited relative axial movement whereby they may be engaged and disengaged, a pinion rotatable with said second clutch member, said first clutch member being slidable on said shaft to move said pinion into and out of mesh with said gear, means for moving said pinion into and out of mesh with said gear, means for engaging said two clutch members after said pinion is moved out of mesh with said gear, and means for preventing engagement of said two clutch members until after said gear and pinion have been disengaged.

In witness whereof, I have hereunto set my hand at Indianapolis, Indiana, this 15th day of April, A. D. one thousand nine hundred and twenty seven.

DALMAR T. BROWNLEE.